US005791656A

United States Patent [19]

Nakamura

[11] Patent Number: 5,791,656

[45] **Date of Patent: *Aug. 11, 1998**

[54] SEAL ASSEMBLY FOR HEAT TREATMENT FURNACES USING AN ATMOSPHERIC GAS CONTAINING HYDROGEN GAS

[75] Inventor: Teruhisa Nakamura, Shin Nanyo, Japan

[73] Assignee: Nisshin Steel Co., Ltd., Tokyo, Japan

[ * ] Notice: The term of this patent shall not extend beyond the expiration date of Pat. No. 5,693,288.

[21] Appl. No.: 689,271

[22] Filed: Aug. 6, 1996

Related U.S. Application Data

[63] Continuation of Ser. No. 596,170, Feb. 13, 1996, Pat. No. 5,693,288.

[30] Foreign Application Priority Data

Jun. 24, 1994 [JP] Japan .................................... 6-164903
Oct. 26, 1994 [JP] Japan .................................... 6-284560

[51] Int. Cl.$^6$ ........................................ F16J 15/34
[52] U.S. Cl. ........................................ 277/362
[58] Field of Search .................................... 277/81 R, 83, 277/92

[56] References Cited

U.S. PATENT DOCUMENTS 2,148,093 2/1939 Wheeler .................................... 277/83
2,716,579 5/1955 Staak .................................... 277/83
2,974,982 3/1961 Luenberger .................................... 277/83
3,291,468 12/1966 Albertson et al. .................................... 432/242
5,029,880 7/1991 Johansson .................................... 277/83

*Primary Examiner*—Diego F. F. Gutierrez
*Assistant Examiner*—John L. Beres
*Attorney, Agent, or Firm*—Kanesaka & Takeuchi

[57] ABSTRACT

A seal assembly is located at an entrance and/or an exit of a heat treatment furnace with a side plate for heat treating a continuously fed metallic strip. The furnace includes an elastic rotating roll which has a roll body and a roll shaft, and is engaged with an elastic pad fixed on a surface of a seal plate and the metallic strip to seal an inside of the furnace against outside air. The seal assembly includes at least two closely-set slip disks arranged in an axial direction of an end side of the roll body, and at least one elastic disk engaging the side plate of the furnace. The at least two slip disks and at least one elastic disk are fitted over the roll shaft between the side plate of the furnace on which the elastic rotating roll is rotatably mounted and the roll body of the elastic rotating roll such that the at least two slip disks and the at least one elastic disk are in surface contact with each other. In the contact surfaces present from the roll body to the side plate of the furnace, the contact surfaces between the at least two slip disks have the lowest coefficient of dynamic friction.

8 Claims, 13 Drawing Sheets

SEAL ASSEMBLY FOR HEAT TREATMENT FURNACES USING AN ATMOSPHERIC GAS CONTAINING HYDROGEN GAS

CROSS-REFERENCE TO RELATED APPLICATION

This is a continuation application of Ser. No. 08/596,170, filed on Feb. 13, 1996, now U.S. Pat. No. 5,693,288.

TECHNICAL FIELD

The present invention relates to a seal assembly having an improved sealability, which is used at an entrance and/or exit of a heat treatment furnace for annealing, stress relieving annealing or otherwise heat treating a metallic strip such as a stainless steel or high alloy strip with no formation of oxide films on the surface thereof, using a reducing, combustible atmospheric gas containing hydrogen gas as a furnace gas, thereby isolating the inside of the furnace from the outside air.

BACKGROUND TECHNIQUE

In a heat treatment furnace for annealing, stress relieving annealing or otherwise heat treating a metallic strip such as a stainless steel or high alloy strip while no oxide film is formed on the surface thereof, a combustible, reducing atmospheric gas such as a mixed gas consisting of 75% of hydrogen gas and 25% of nitrogen gas (hereinafter called simply the furnace gas) is fed into the furnace.

An assembly for isolating the inside of the furnace from the outside air is usually mounted on portions of the entrance and/or exit thereof through which the metallic strip is to be passed, thereby preventing mixing of the outside air with the furnace gas (hereinafter called sealing). A typical example of such a seal assembly is disclosed in Japanese Patent Publication No. 42(1967)-18893. As disclosed, this seal assembly is built up of elastic rotating rolls for holding therebetween a metallic strip continuously fed into the furnace, said rolls rotating at a speed substantially equal to the feed speed of the metallic strip, a flexible seal plate fixed at ends to the furnace body, and felt or other elastic pads for making seals between the seal plate and the elastic rotating rolls.

One example of a conventional heat treatment furnace for heat treating a metallic strip continuously fed thereinto using an atmospheric gas containing hydrogen gas as a furnace gas will now be explained generally with reference to a shaft type of a bright annealing furnace for annealing a stainless steel strip or other high alloy strip.

FIG. 3 is a schematic view of the general structure of a shaft type of bright annealing furance for a stainless steel strip etc. A metallic strip S is guided by a bottom roll into the furnace through a seal assembly 13 located on the entrance side of of a furnace body 1, where it is heated to a predetermined temperature, then cooled and finally annealed as desired. The thus treated strip is then fed out of the furnace through a seal assembly 13 located on the exit side. Usually, a reducing, combustible furnace gas 12 containing hydrogen gas is continuously fed into the furnace while it is cooled and circulated through, so that the inside pressure of the furnace can be kept an about 10 to about 50 mm $H_2O$ higher than the outside air. It is here to be noted that while the furnace is in operation, the furnace gas 12 leaks little by little through the seal assemblies 13 and 13 located at the entrance and exit of the furnace body 1, thereby preventing the air (oxygen) from entering into the furnace body 1 and so avoiding mixing of the air with the furnace gas 12.

FIGS. 4 and 5 are enlarged front and side views of a conventional seal assembly located on the exit side of the furnace respectively. FIG. 6 is an explanatory front view of a roll-driving mechanism in a conventional seal assembly. The conventional seal assembly, shown at 13, is of the structure wherein elastic pads 15 formed of felt or a felt equivalent are fixed on the surfaces of seal plates 14 secured on a furnace wall 2 by a bolt-and-nut combination, and elastic rotating rolls 16 with the surfaces made of elastic rubber are engaged with the metallic strip S and elastic pads 15 by the working force of a piston rod **11*a* driven by a cylinder, so that the inside of the furnace 1** can be isolated from the outside air.

A brief account will here be given of a roll-driving mechanism 11 for pressedly engaging the elastic rotating rolls 16 with the elastic pads 15 fixed on the surfaces of the seal plates 14 secured on the furnace wall 2 and the metallic strip S by referring to FIGS. 4 to 6. A lever **11*b* is pivotally fixed on a fixed pin 11*c* that defines the center of rotation thereof. The lever 11*b* is provided at its front end with a bearing 16*b* for supporting a roll shaft 16*a* of the elastic rotating roll 16, with the rear end receiving the working force of the piston rod 11*a* driven by the cylinder. The working force of this piston rod 11*a* allows the two elastic rotating rolls 16 and 16 to be pressedly engaged with the metallic strip S that is passed between the elastic rotating rolls 16 and 16 and, at the same time, to be pressedly engaged with the elastic pads 15 and 15 fixed on the seal plates 14 and 14, respectively. Thus, the inside of the furnace body 1 is isolated from the outside air, so that the furnace body 1 can be sealed up against entrance of the outside (atmospheric) air into the furnace body 1**.

In the above conventional seal assembly 13, it has been proposed to attach a roll body **16*c* to the side plate 2*a* of the furnace wall 2 through three washers 16*d*, 16*e* and 16*f* as shown in FIGS. 7**(*a*) and 7(*c*) or through two washers **16*d* and 16*f* as shown in FIGS. 8**(*a*) and 8(*c*) (see Japanese Patent Publication No. 42-18893). As illustrated in FIGS. 7(*a*), 7(*c*), 8(*a*) and 8(*c*), the roll body **16*c* is tightly provided at one end with the rubber washer 16*d*, friction washer 16*e*, and metallic sealing washer 16*f*, or alternatively the rubber washer 16*d* and metallic sealing washer 16*f*, in order from the side of the roll body 16*c*. A closed-cell form of spongy neoprene is used for the rubber washer 16*d*, fluorocarbon resin having a low wear rate (e.g., polytetrafluoroethylene resin) for the friction washer 16*e*, and carbon steel, stainless steel or non-ferrous metal for the metallic sealing washer 16*f***.

However, the seal assembly 13 with the above elastic rotating roll 16 built in it has the following problems.

Referring to FIGS. 7(*a*) and 7(*b*), the metallic sealing washer **16*f* comes in sliding contact with the side plate 2*a* of the furnace wall 2 on a plane shown by A. The coefficient of friction varies largely between the cases when greased and when not greased. The rotational force of the elastic rotating roll 16 is transmitted to the side plate 2*a* of the furnace wall 2 by the elasticity of the rubber washer 16*d*. When fully greased, the sliding surface is defined by the plane A, but when insufficiently greased, the sliding surface is defined by a plane B on which the metallic sealing washer 16*f* comes in contact with the friction washer 16*e*. When the plane B becomes the sliding surface, the metallic sealing washer 16*f*, which remains fixed, comes in contact with the rotating roll shaft 16*a*, and this causes them to be mutually damaged and worn away, as shown in FIG. 7**(*c*). As a result, the sealing properties of the metallic sealing washer **16*f* become worse, because the gap between the elastic rotation roll 16 and the metallic sealing washer 16f is widened or the gap between the elastic pad 15 and the metallic sealing washer 16f** is widened.

Referring to FIGS. 8(*a*) and 8(*b*) of the conventional seal assembly, there is a large variation of the coefficient of friction as shown in FIG. 8(*b*) between the cases when greased and when not greased, because the metal parts come in sliding contact with each other on a plane A, as in the case of FIG. 7(*a*). When fully greased, the sliding surface is defined by the plane A. When not sufficiently greased, however, the sliding surface is defined by any of planes A, B and C, because they have a close coefficient of friction. Usually, however, greasing cannot be applied to the entrance and exit of a heat treatment furnace such as a bright annealing furnace. So far, the metallic strip S has been pre-treated in a degreasing (cleansing) apparatus, because it is colored or stained by deposition of oil matter. Even though greasing should be restricted to the ends of the roll, the grease would be gradually transmitted to the middle of the roll, resulting in coloration or contamination and, hence, degradation, of the surface of the metallic strip S. Now consider the case where greasing is done but it is done insufficiently. When the sliding surface is defined by the plane A, the metallic sealing washer 16f is brought into rotating, sliding contact with the frame 2, whereby they are mutually damaged. When the sliding contact is defined by the plane B, the rubber washer 16d is drastically worn away. Besides, since rotational torque is transmitted to the rubber washer 16d from the end surface sides of the roll while the metallic sealing washer 16f remains substantially fixed due to friction with the side plate 2a of the furnace wall 2, the rubber washer 16d remains braked on the plane B. Consequently, the rubber washer 16d is torsionally distorted and so out of normal disk shape, whereby it is spaced away from the plane B or C, making the sealing properties of worse. When the sliding surface is defined by the plane C on which the rubber washer 16d comes in contact with the roll body 16c, the rubber washer 16d is rapidly worn away due to sliding contact with the lining material of the elastic rotating roll 16 and with the metallic portion of the end of the roll. Besides, the rubber washer 16d is torsionally distorted and so out of normal disk shape, as is the case where the sliding surface is defined by the plane B. On the plane B or C, the metallic sealing washer 16f remains substantially fixed due to friction with the side plate 2a of the furnace wall 2 to define the fixed side. The metallic sealing washer 16f comes in contact with the rotating roll shaft 16a and with the side plate 2a of the furnace wall 2 as well because the torque transmitted from the roll is larger than that in the case of FIG. 7(*a*), whereby they are mutually damaged and so worn away. Consequently, the sealing properties of the seal assembly become worse, as can be seen from FIG. 8(*c*).

In the seal assembly shown in FIG. 7(*a*), the rotating portion is usually separated by the contact planes B from the fixed portion, and the metallic sealing washer 16f and the rotating roll shaft 16a are brought into contact with each other and so mutually worn away. In the seal assembly shown in FIG. 8(*a*), sliding movement occurs on any one of the contact planes A, B and C. On the plane A the side plate 2a of the furnace wall 2 and the metallic sealing washer 16f are worn away, and by sliding movement on the plane B or C, the rubber washer 16d per se is worn away while the metallic sealing washer 16f and roll shaft 16a are brought into contact with each other and so mutually worn away. In other words, when the contact surface causing slippage is defined by a member other than the friction washer 16e, the sealing properties of the seal assembly become worse, because it is worn away due to its poor wear resistance to form a gap. As a result, the amount of the furnace gas 12 leaking out of the furnace increases with an increase in the consumption of the atmospheric gas. On fire, the seal assembly is heavily damaged. Frequent replacement of worn away parts is thus required.

However, even when at least one of the worn-away washers 16d, 16e and 16f provided in order from the end surface of the roll body 16c of the elastic rotating roll 16 is replaced, it is required for safety's sake that the feeding of the metallic strip S be interrupted to cool the furnace body 1 from within the furnace body 1, and that the furnace gas 12 be expelled out by the injection of inactive gas such as nitrogen gas etc. This is very time-consuming and troublesome, and costs much as well. When the inner surface of the side plate 2a of the furnace wall 2 is burnt away, bitten off or otherwise worn away to such an extent that smooth rotation is inhibited, it is also required to replace the side plate 2a of the furnace wall 2 in its entirety or remove at least the elastic rotating roll 16 from the side plate 2a of the furnace wall 2 so that another reinforcement member can be attached to the inner surface of the side plate 2a of the furnace wall 2. For safety's sake, it is then required that the feeding of the metallic strip S is interrupted and the furnace gas 12 is removed from within the furnace body 1. This offers disadvantages preventing an easy operation thereof.

DISCLOSURE OF THE INVENTION

An object of the present invention can solve the above-mentioned conventional technical defects and provide a seal assembly of greater safety and improved efficiency and productivity, which is used with a heat treatment furnace using a furnace gas containing hydrogen gas, wherein a drop of the sealing properties caused by abrasion from damages and slippage between washers located at the ends of the roll body of the elastic rotating roll and mutual damages on the washers and the side plate of the furnace wall or a slippage therebetween is prevented, the sealing properties of the ends of the elastic rotating roll that rotates in synchronism with the moving metallic strip are in good condition, and the frequency of replacement of the elastic rotating roll and washers is decreased.

In order to resolve the problems of the present invention, the present inventor has made research to find that upon the elastic roll rotated in association with the movement of the metallic strip, a slippage occurs between a rubber washer and a metallic sealing washer provided at the end of the roll body of the elastic rotating roll or the metallic sealing washer and the side plate of the furnace wall, whereby such parts are worn away and so decreased in service life, by noticing improved resistance to wear, wherein such a slippage is restricted to between parts having a low coefficient of friction and improved wear resistance based upon the coefficients of friction listed in FIG. 2 to be further explained later. Consequently, in a seal assembly located at an entrance and/or exit of a heat treatment furnace using an atmospheric gas containing hydrogen gas as furnace gas and including an elastic rotating roll which is engaged with an elastic pad fixed on the surface of a seal plate and the metallic strip to seal the inside of the furnace against the outside air, if at least two axially and closely arranged slip disks and an elastic disk are fitted over a roll shaft between the side plate of the furnace wall, on which the elastic rotating roll is rotatably mounted, and a roll body of the elastic rotating roll, said disks are in surface contact with each other. Of the contact surfaces of the parts present from the roll body to the side plate of the furnace wall, the contact surface of the slip disks has the lowest coefficient of dynamic friction. Thus, a slippage occurs predominantly between the closely arranged slip disks while rotating portion and fixed portion are spaced away from each other on both sides of said slip disks, so that the transmission of the rotation of the elastic rotating roll in association with the movement of the metallic strip to the elastic disk provided on the side plate of the furnace wall can be prevented. This prevents the torsional distortion of the elastic disk and the wearing of the elastic disk, the side plate of the furnace wall, the roll shaft, and the end surfaces of the roll, resulting in prevention of a drop of the sealing properties and an increase in the service life of the elastic rotating roll and the side plate of the furnace wall.

BRIEF DESCRIPTION OF THE DRAWINGS

The seal assemblies used with a heat treatment furnace using an atomospheric gas containing hydrogen gas according to the present invention will now be explained at great length with reference to the accompanying drawings.

BEST MODE FOR CARRYING OUT THE INVENTION

Figure 1:
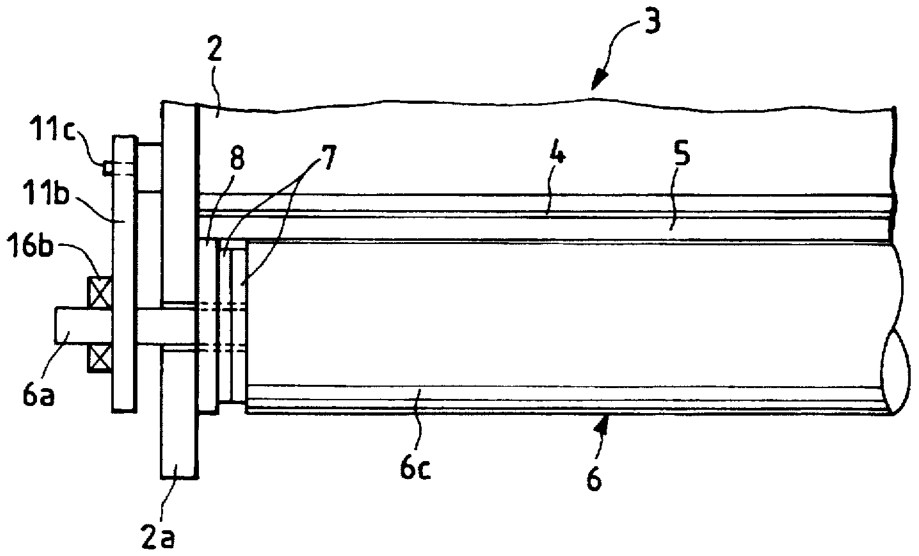
FIG. 1 is a side elevational view of an end portion of an elastic rotating roll in one embodiment of the present invention.
Figure 2:
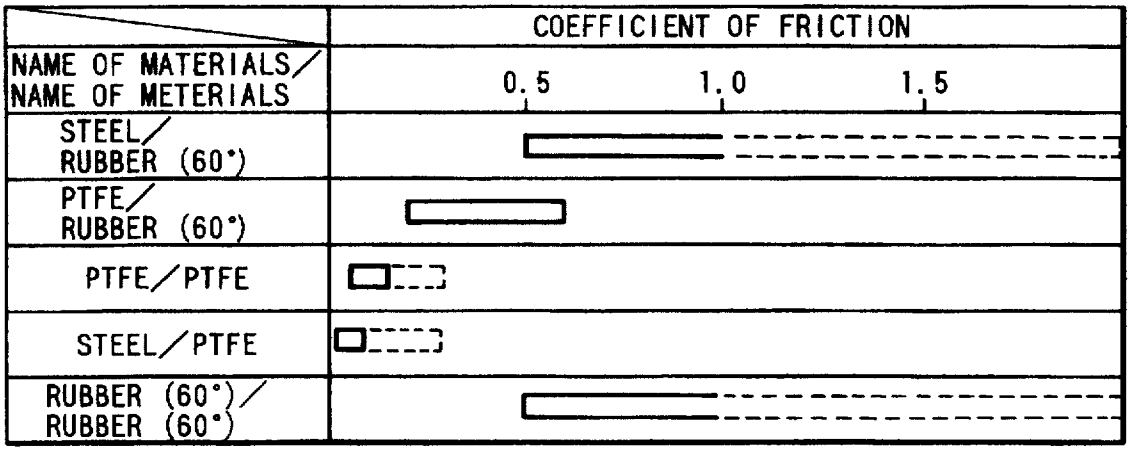
FIG. 2 is a graph which illustrates a general experimental range of frictional coefficients between materials to be used in the present invention.
Figure 3:
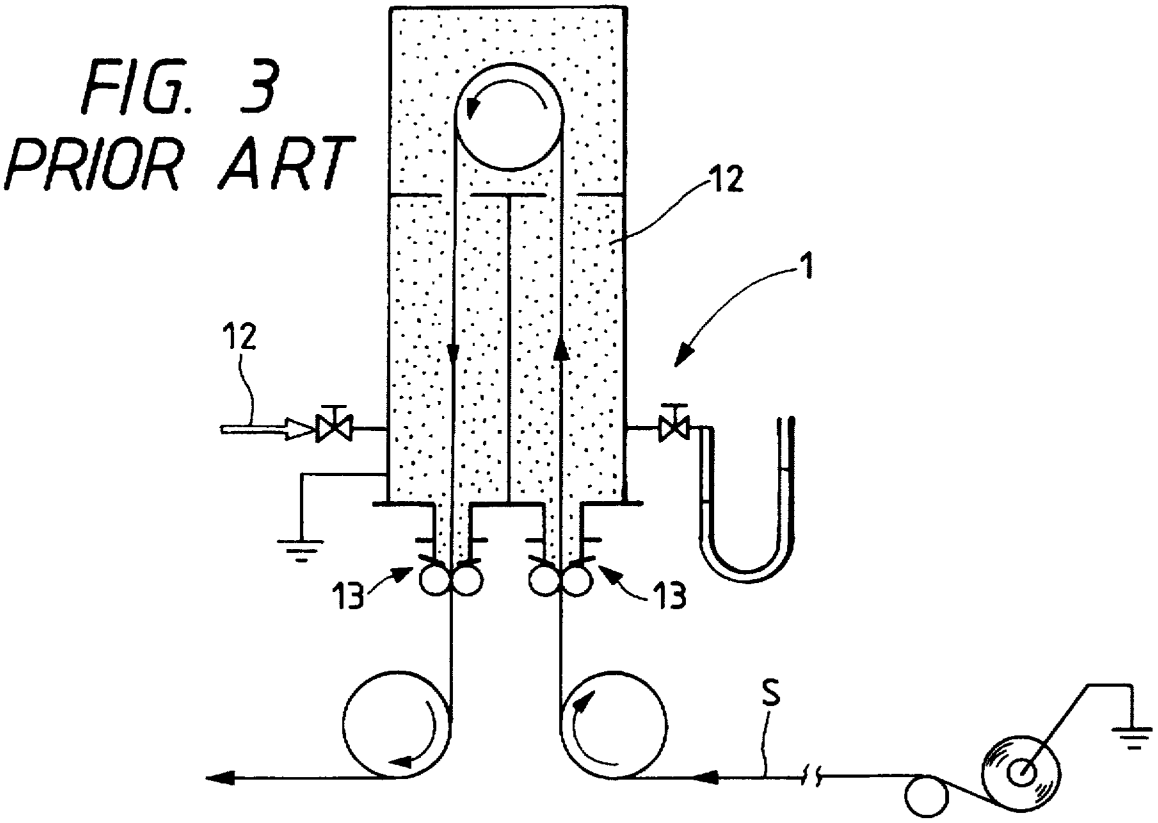
FIG. 3 PRIOR ART
FIG. 3 is a schematic view of the general structure of a shaft type of bright annealing furnace for a stainless steel strip.
Figure 4:
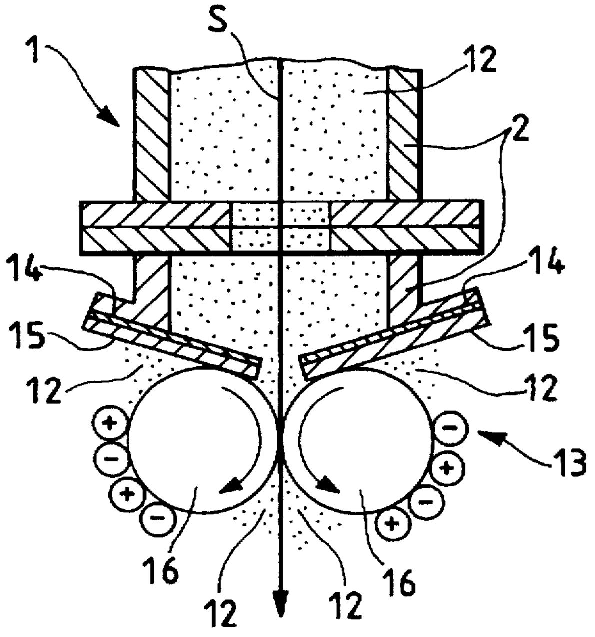
FIG. 4 PRIOR ART
FIG. 4 is an explanatory front sectional view of a conventional seal assembly which is disposed at an exit side of the bright annealing furnace.
Figure 5:
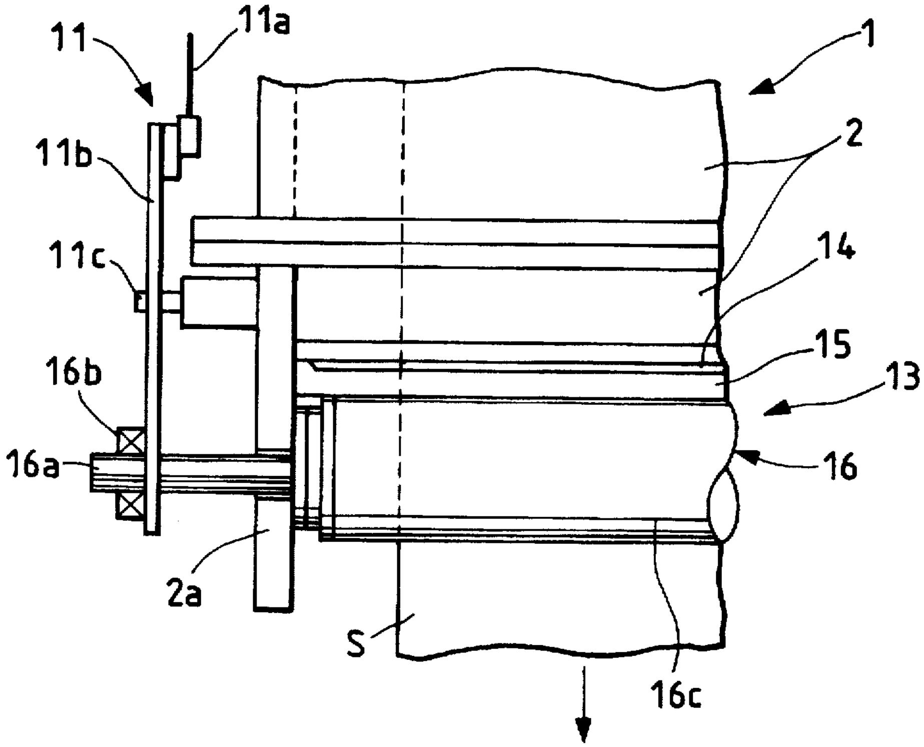
FIG. 5 PRIOR ART
FIG. 5 is a side elevational view of an end portion of an elastic rotating roll in a conventional seal assembly.
Figure 6:
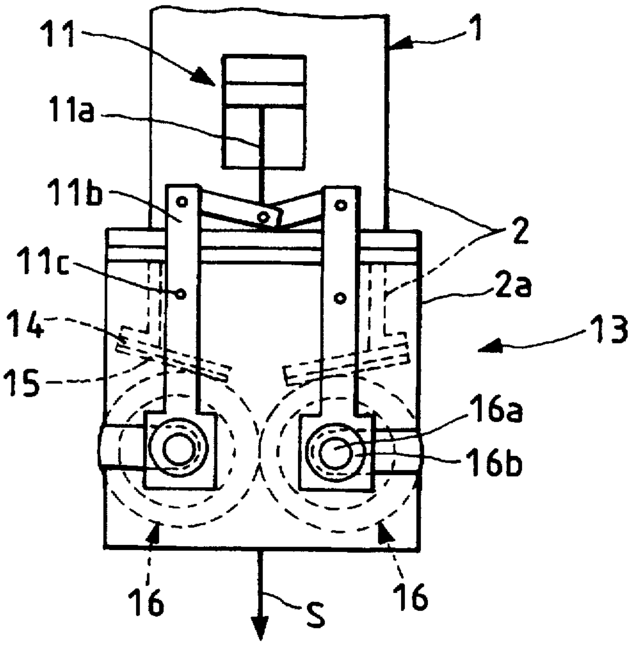
FIG. 6 PRIOR ART
FIG. 6 is an explanatory front view of a roll-driving mechanism in the conventional seal assembly.
Figure 7A:
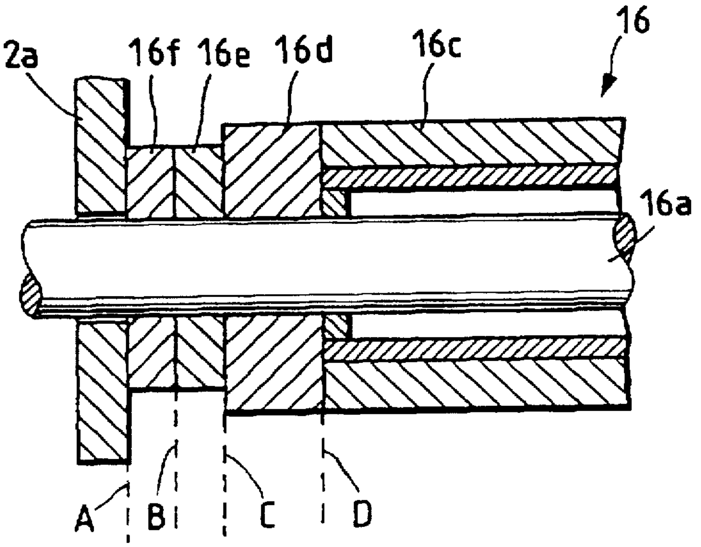
FIG. 7(a) PRIOR ART
FIGS. 7(*a*)–7(*c*) and 8(*a*)–8(*c*) show the conventional seal assembly wherein each of FIGS. 7(*a*) and 8(*a*) is an explanatory main side sectional view, each of FIGS. 7(*b*) and 8(*b*) being a graph which illustrates frictional coefficients between the respective members in FIGS. 7(*a*) and 8(*a*), and each of FIGS. 7(*c*) and 8(*c*) being an explanatory view which illustrates a worn state after the conventional seal assembly is used.
Figure 7B:
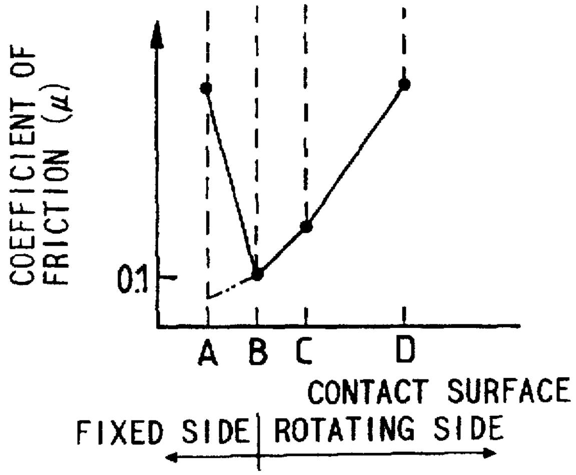
FIG. 7(b) PRIOR ART
Figure 7C:
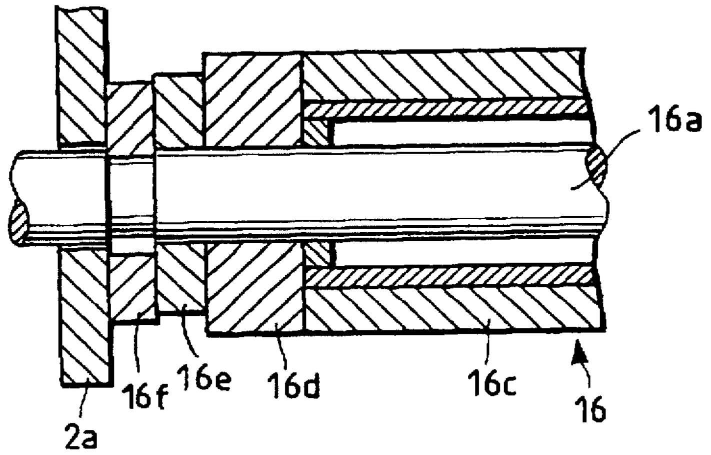
FIG. 7(c) PRIOR ART
Figure 8A:
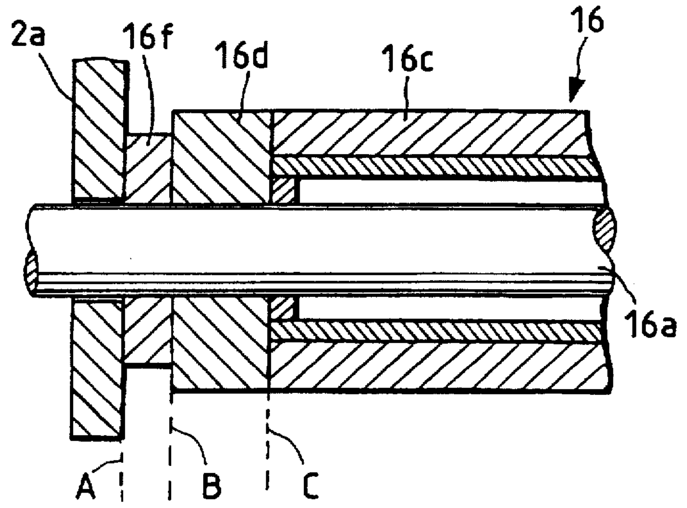
FIG. 8(a) PRIOR ART
Figure 8B:
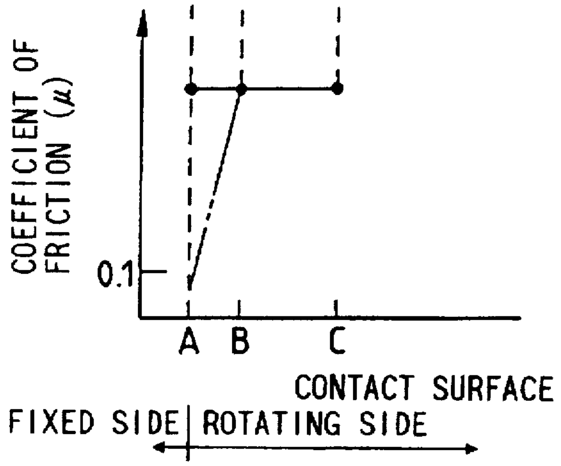
FIG. 8(b) PRIOR ART
Figure 8C:
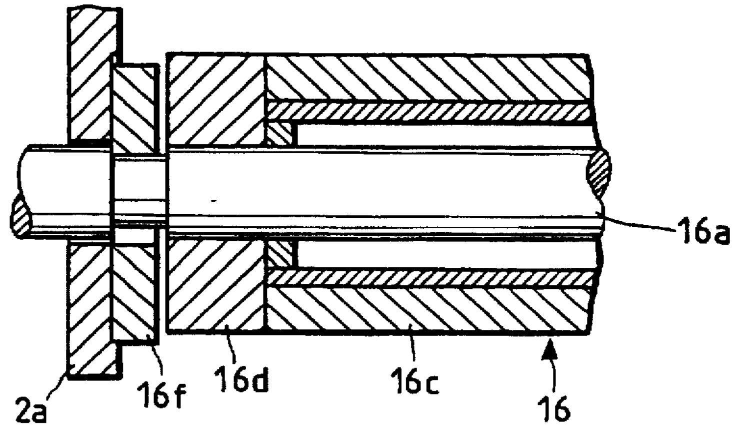
FIG. 8(c) PRIOR ART

Referring to the accompanying drawings, reference numeral 1 generally represents a furnace body of a heat treatment furnace in which a reducing, combustible atmospheric gas containing hydrogen gas is used as a furnace gas 12 for continuously annealing, stress relieving annealing or otherwise heat treating a metallic strip S such as a stainless steel strip. In the furnace body 1, the prevailing pressure is kept about 10 to about 50 mm $H_2O$ higher than the outside air by feeding the furnace gas 12 thereto.

Reference numeral 2 stands for a furnace wall located at an entrance and exit of the furnace body 1 with the furnace gas 12 prevailing therein.

Reference numeral 3 denotes a seal assembly for a heat treatment furnace using an atmospheric gas containing hydrogen-gas as the furnace gas 12 according to the present invention, said seal assemly being located at the entrance and/or exit of the furnace body 1 with the furnace gas 12 prevailing therein. The seal assembly 3 is built up of a seal plate 4 fixed on the furnace wall 2, an elastic pad 5 fixed on the seal plate 4, and an elastic rotating roll 6 to be engaged with the elastic pad 5 and metallic strip S, thereby sealing up the furnace body 1 for preventing a leakage of the furnace gas 12.

The seal plate 4, for instance, is formed of a flexible, difficult-to-oxidize stainless steel thin sheet of about 0.5 to about 2.0 mm in thickness. The seal plate 4, wider than the width of the metallic strip S to be heat treated but narrower than the space between both side plates 2*a* and 2*a* of the furnace wall 2, is fixed on the furnace wall 2 by fixing means such as a bolt and nut combination.

An elastic pad 5 of felt etc. that is slightly, for instance, a few millimeters, longer than the length of the plate 4 is fixed onto the surface of the short seal plate 4, using an adhesive material or a bolt-and-nut combination. Both side edges of the elastic pad 5 are so constructed that they project from the both side edges of the seal plate 4 to the both side plates 2*a* and 2*a*, so that the both side edges of the elastic pad 5 are slightly bent, and the sealing properties of the seal assembly 3 can be so maintained that the furnace body can be well sealed against leakage of the furnace gas 12 and entering of the outside air into the furnace bocy. This can be obtained in the same manner by the elastic pad 5 made of rubber or the like.

The elastic rotating roll 6 must be of surface resiliency and so is formed of elastic members such as silicone rubber (ASTM Code Q and composed of an alkylsiloxane copolymer), fluororubber (ASTM Code FKM and composed of a hydrocarbon fluoride copolymer), chloroprene rubber (ASTM Code CR and composed of a chloroprene polymer), nitrile-butadiene rubber (ASTM Code NBR and composed of a butadiene-acrylonitrile copolymer), styrene-butadiene rubber (ASTM Code SBR and composed of a butadiene-styrene copolymer), ethylene-propylene rubber (ASTM Code EPDM and composed of an ethylene-propylene-diene copolymer), urethane rubber (ASTM Code U and composed of a polyesther (ether)-isocyanate polycondensate), hydrin rubber (ASTM Code CO and composed of an epchlorohydrin copolymer), butyl rubber (ASTM Code IIR and composed of an isobutylene-isoprene copolymer), isoprene rubber (ASTM Code and IR composed of synthetic isoprene rubber), butadiene rubber (ASTM Code BR and composed of a butadiene copolymer), chlorinated polyethylene (ASTM Code CM and composed of chlorinated polyethylene), acrylic rubber (ASTM Code ACM and composed of an acrylate ester copolymer), polysulfide rubber (ASTM Code T and composed of an alkylene sulfide polymer), and chlorosulfonated polyethylene (ASTM Code CSM and composed of chlorosulfonated polyethylene). Alternatively, the elastic rotating roll may be formed of a metallic roll member with the outer surface made of the above elastic member or material made of felt, etc.

A plurality of closely arranged slip disks 7, each having a through-hole through which a roll shaft 6*a* of the elastic rotating roll 6 is to be passed, is located between a roll body 6*c* of the elastic rotating roll 6 and the side wall 2*a* of the furnace wall 2 and mounted around the roll shaft 6*a*. The slip disk 7 may be made of a plate material 7*a* with the contact surface having a low coefficient of dynamic friction and being difficult to wear off, for instance, a plate form of fluorocarbon resin such as polytetrafluoroethylene resin or fluorocoarbon resin such as polytetrafluoroethylene resin as the main component, and to improve wear resistance, rigidity and electrical conductivity. This plate form of fluorocarbon resin may contain a filler or fillers selected from the group consisting of glass fiber, graphite, glass fiber plus molybdenum disulfide, glass fiber plus graphite, bronze, and carbon fiber. To obtain the slip disk 7*b*, a fluorocarbon resin only or a fluorocarbon resin with the filler is coated, sprayed, baked or the resin in a form of a sheet being pasted to the entire surface, including the inner, outer and both side surfaces of a metallic plate 7*x*. To obtain the slip disk 7*c*, a fluorocarbon resin only or a fluorocarbon resin with the filler is coated, sprayed, baked or the resin in a form of a sheet being pasted on both sides of the metallic plate 7*x*. To obtain the slip disk 7*d*, a fluorocarbon resin only or a fluorocarbon resin with the filler is coated, sprayed, baked or the resin in a form of a sheet being pasted to one side only of the metallic plate 7*x* proximate to the roll body 6*c*. To obtain the slip disk 7*e* a fluorocarbon resin only or a fluorocarbon resin with the filler is coated, sprayed, baked or the resin in a form of a sheet being pasted to one side only of the metallic plate 7*x* proximate to the wall 2*a* of the furnace wall 2 (reverse to the side of roll body 6*e*). As to obtaining slip disk 7*f*, a metallic plate having the metallic surface is formed. The outer diameter of this slip disk 7*f* has one-half the maximum thickness of the metallic strip S or more and is slightly smaller than that of the roll body 6*c* of the elastic rotating roll 6, provided that sealability can be well maintained. When the elastic rotating roll 6 is engaged with the elastic pad 5 and the metallic strip S, its outer diameter becomes smaller due to the deformation of its outer periphery but the slip disk 7 suffers from no deformation owing to its rigidity and so is substantially invariable in the outer diameter because the slip disk 7 is made slightly smaller in the outer diameter than the elastic rotating roll 6, whereby there is maintained sealability between the roll bodies 6*c* even while they are contacting each other.

Figure 10A:
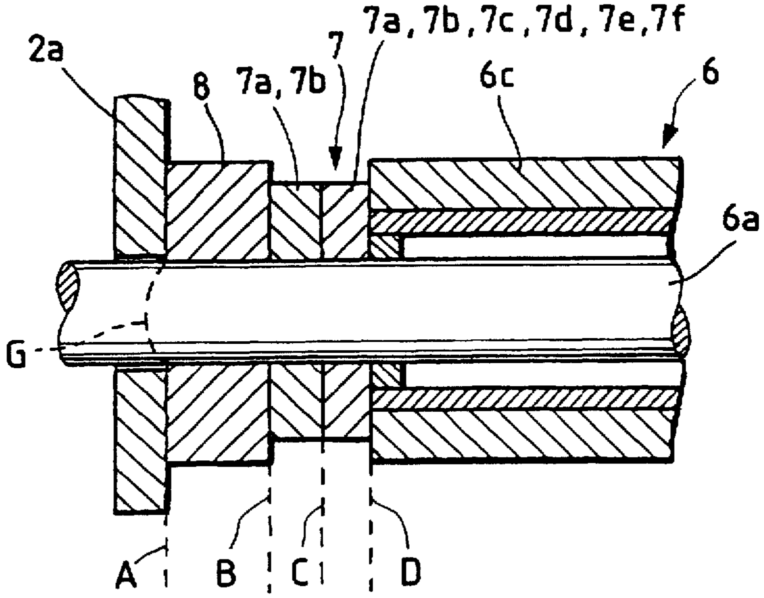
FIGS. 10(*a*) to 15(*b*) show embodiments of the assemblies of the present invention with each of FIGS. 10(*a*), 11(*a*), 12(*a*), 13(*a*), 14(*a*) and 15(*a*) being an explanatory main side sectional view, and each of FIGS. 10(*b*), 11(*b*), 12(*b*), 13(*b*), 14(*b*) and 15(*b*) being a graph which illustrates frictional coefficients between the respective members in FIGS. 10(*a*)–15(*a*).
Figure 10B:
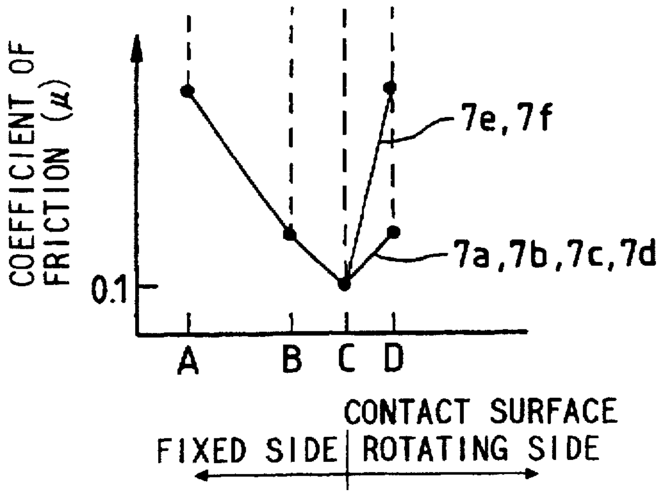
Figure 12A:
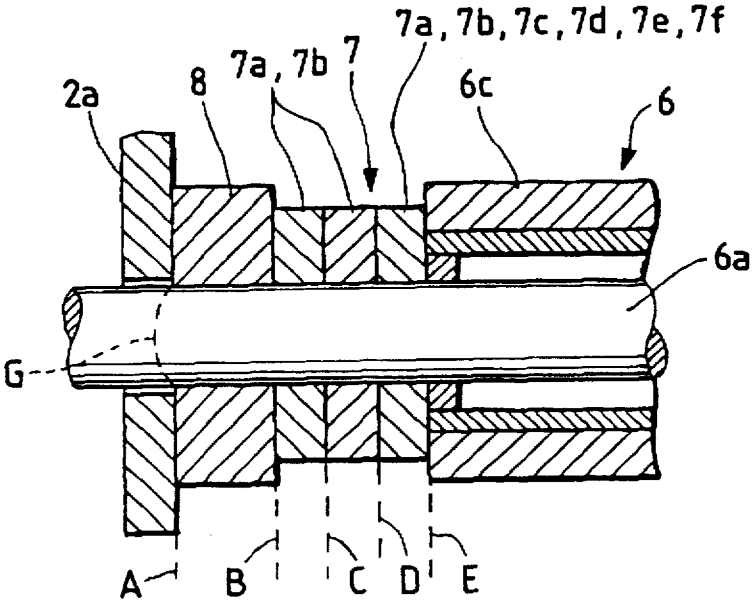
Figure 12B:
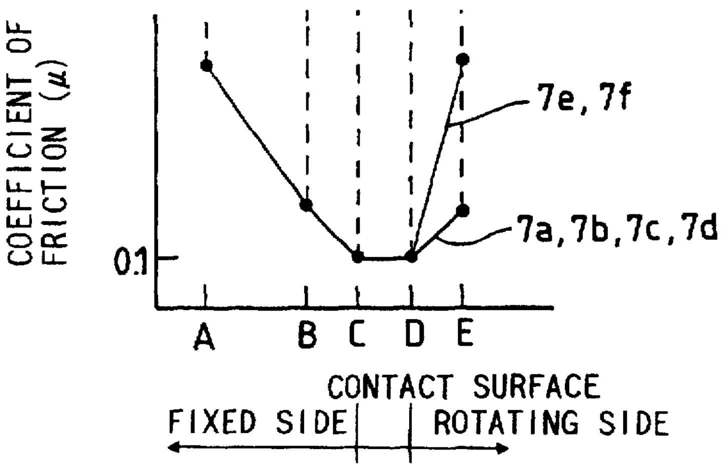

An elastic disk 8 is located on the side of the slip disk 7 that faces the side wall 2*a* of the furnace wall 2 while it is in contact with the slip disk 7. The elastic disk 8 is fitted over the roll shaft 6*a* of the elastic rotating roll 6, which is passed through a through-hole centrally formed therein. The surface of contact of the elastic disk 8 with the slip disk 7, as shown by plane B in FIGS. 10(*a*) to 15(*a*), has a coefficient of dynamic friction larger than that of the contact surfaces of the slip disks 7, shown by plane C in FIGS. 10(*a*), 11(*a*) and 13(*a*)–15(*a*) and shown by plane C and plane D in FIG. 12(*a*). This elastic disk 8 may be formed of a rubber material such as silicone rubber, fluororubber, chloroprene rubber, nitrile-butadiene rubber, styrene-butadiene rubber, ethylene-propylene rubber, urethane rubber, hydrin rubber, butyl rubber, isoprene rubber, butadiene rubber, chlorinated polyethylene, acrylic rubber, polysulfide rubber, and chlorosulfonated polyethylene. Preferably, the rubber material used has a rubber hardenss of A40° to 60° as measured according to JIS K6301 (or corresponding to a rubber hardness of about 65 to about 80 as measured according to JIS K6050). Alternatively, it may be made of an elastic member which has an expanding mechanism in the axial direction of the roll shaft with a fluid poured therein. For example, an elastic member such as silicone rubber, fluororubber, chloroprene rubber, nitrile-butadiene rubber, styrene-butadiene rubber, ethylene-propylene rubber, urethane rubber, hydrin rubber, butyl rubber, isoprene rubber, butadiene rubber, chlorinated polyethylene, acrylic rubber, polysulfide rubber, and chlorosulfonated polyethylene, etc. may be centrally provided with an expanding mechanism with an inlet port through which a fluid such as air or oil is to be fed into the elastic member It is here to be noted that an elastic disk shown at 8*a* in FIG. 13(*a*) should be restrained from rotation at the side of side plate 2*a* of the furnace wall 2 because the inlet port is connected with a fluid conductor. Two or more such elastic disks 8 may be fitted over the roll shaft 6*a*, if they have no expanding mechanism. Anyhow, the elastic disk should have a rubber hardness large enough to enable the contact surface thereof to be in close contact with the roll with proper elasticity and, at the same time, the roll to rotate smoothly.

Figure 9A:
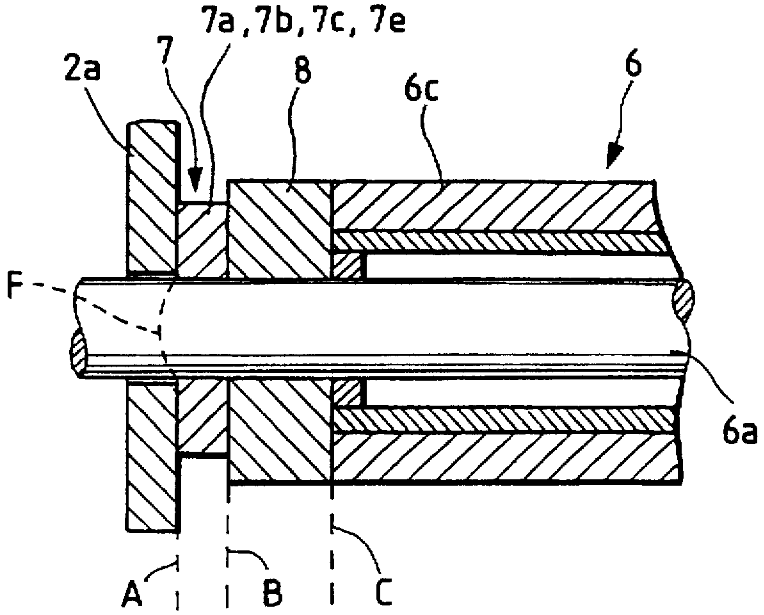
FIG. 9(*a*) is an explanatory main side sectional view of a seal assembly outside the present invention and FIG. 9(*b*) being a graph which illustrates frictional coefficients between the respective members in FIG. 9(*a*).
Figure 9B:
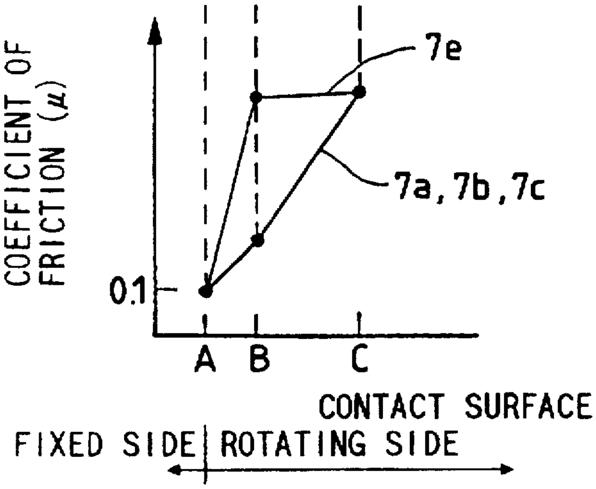

The disk located proximately to the side wall 2*a* of the furnace wall 2 while being in contact therewith, may be elastic disk 8 as mentioned above; or a structure as shown in FIG. 9(*a*); or a slip disk 7*e*, 7*c*, 7*b*, 7*a* per see or which may be a sheet form of fluorocarbon resin such as polytetrafluoroethylene or a metallic sheet in which a fluorocarbon resin such as polytetrafluoroethylene as the main component added by a filler containing any one of glass fiber, graphite, glass fiber plus molybdenum disulfide, glass fiber plus graphite, bronze, and carbon fiber is coated, sprayed, baked, or a sheet being pasted on one or both sides thereof, or the entire surface thereof including the inner, outer and side surfaces; or an elastic disk 8 combined with the slip disks 7*e*, 7*c*, 7*b*, 7*a* in the end face of the roll. Since the slip disk 7 is bent outwardly of the furnace in the through-hole in the side wall 2*a* of the furnace wall 2 by the internal pressure generated from the elastic disk 8 as shown by a broken line F in FIG. 9(*a*), however, it is not preferable to use the surface of the side wall 2*a* of the furnace wall 2 as a sliding plane. In other words, it is preferable to use as the disk to be engaged with the side wall 2*a* of the furnace wall 2 the elastic disk 8 which need not entirely be rotated. The elastic disk 8 is slightly bulged out in the through-hole in the side wall 2*a* of the furnace wall 2 as shown by a broken line G in FIGS. 10(*a*) to 15(*a*), but there is no problem because it is disconnected from the rotating portion by the slip disk 7.

Figure 11A:
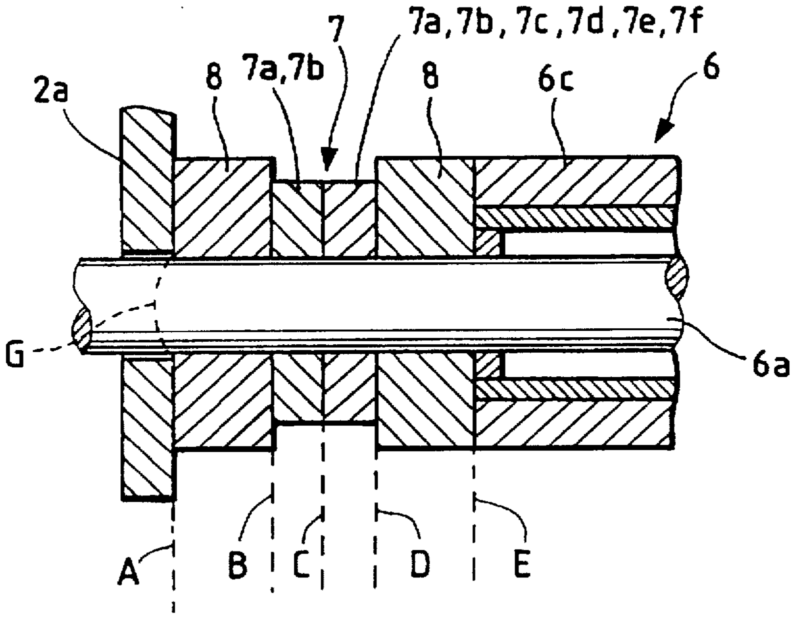
Figure 11B:
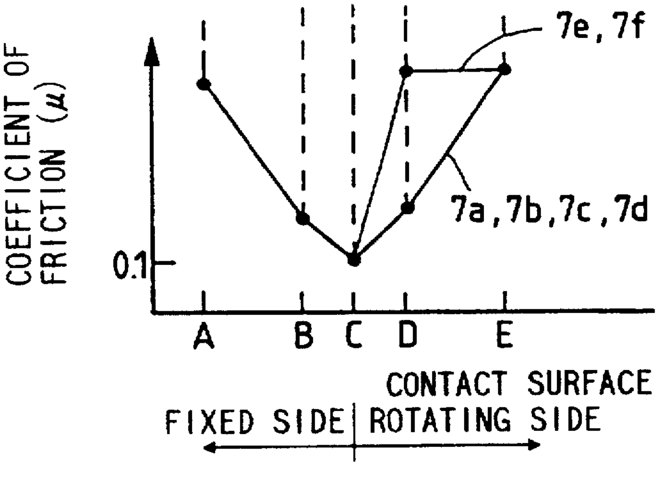
Figure 14A:
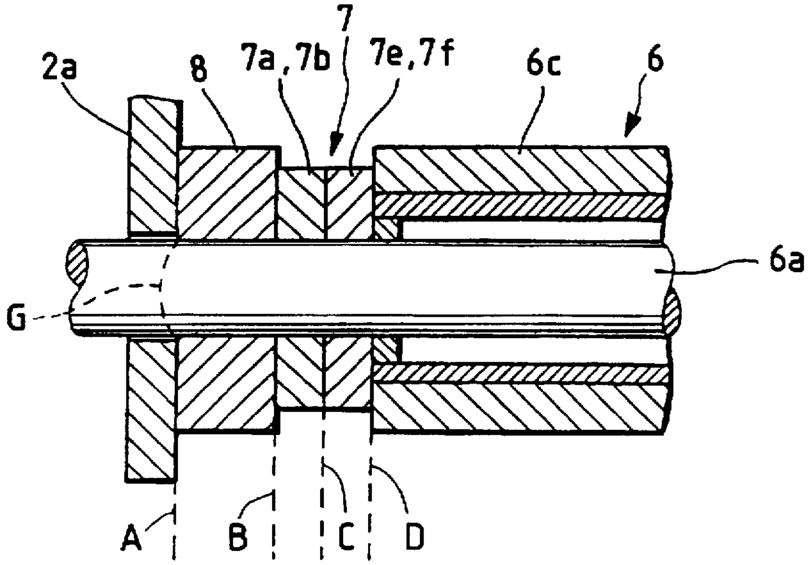
Figure 14B:
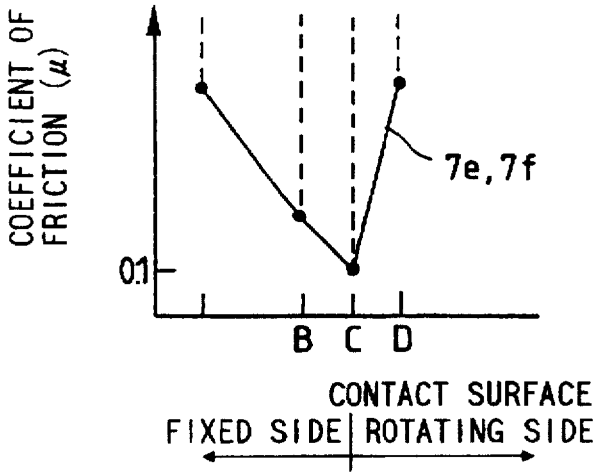
Figure 15A:
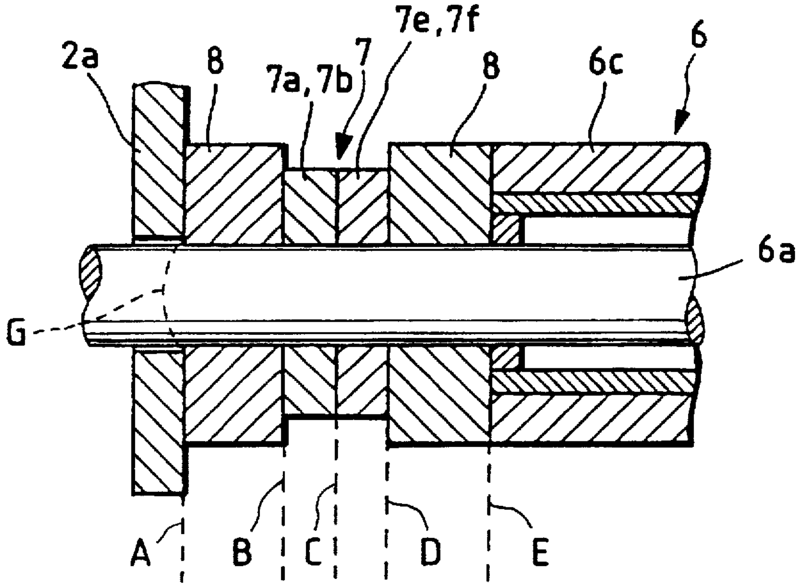
Figure 15B:
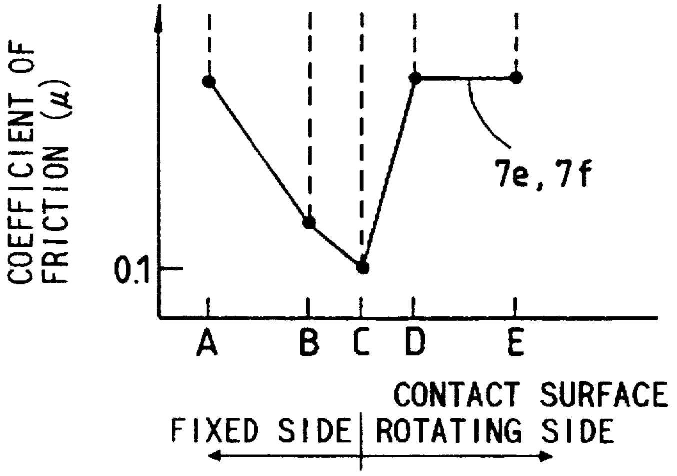
Figure 16A:
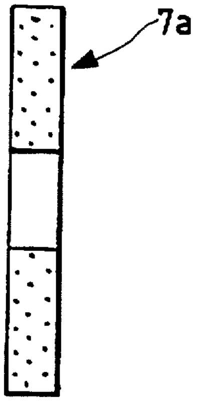
FIGS. 16(*a*)–16(*f*) are explanatory views of slip discs to be used in the assembly of the present invention.
Figure 16B:
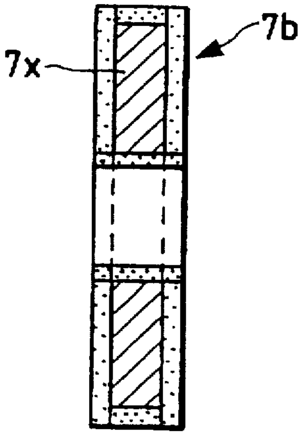
Figure 16C:
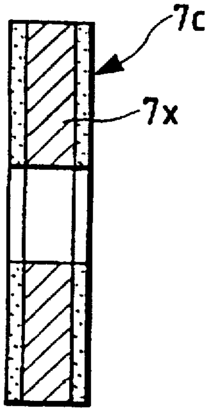
Figure 16D:
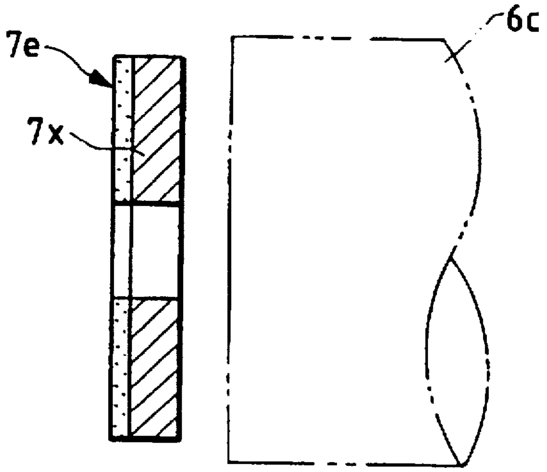
Figure 16E:
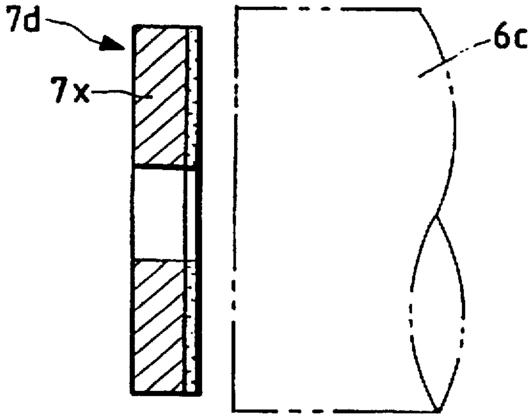
Figure 16F:
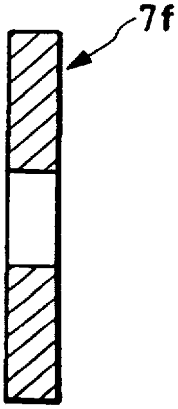

The above-described slip disk 7 generates heat and softens due to its constant friction with the rotating of the elastic rotating roll 6. To increase its rigidity and wear resistance, various fillers may be added thereto. Most of polytetrafluoroethylene resins are likely to be greatly charged with electricity, possibly resulting in spark discharge. Most preferably, the polytetrafluoroethylene resin used should have an electric resistivity value of 1 to $10^7$ Ω·cm. Any resin having an electric resistivity value exceeding $10^7$ Ω·cm is not preferable because it is substantially equivalent to an insulating substance and so is greatly charged with static electricity. Any resin having an electric resistivity lower than 1 Ω·cm, too, is not preferable due to its good conductivity. When the elastic pad 5 is cleaned or inspected, there is a fear of spark discharge resulting from static electricity charged in the body of the worker through the finger tips because of the rubbing of the work clothes or for other reasons. If one of the two slip disks 7, proximate to the roll body 6*c*, such as one shown at 7*f* in FIGS. 14(*a*) and 15(*a*), is formed of a metallic plate having a metallic surface, such as one in FIG. 16(*f*), frictional discharge can then be avoided with a low coefficient of friction. This slip disk is unlikely to be charged with electricity in itself, but should preferably be spaced away from the human body or other charged part for the same reasons as mentioned above. It is also desired that the elastic disk 8 have an electric resistivity of 1 to $10^7$ Ω·cm to prevent it from being charged with electricity for the same reasons as mentioned above. In particular, the elastic disk is designed to rotate in unison with the elastic rotating roll 6, for instance, those located proximately to the roll body 6*c*, as shown in FIGS. 11(*a*), 13(*a*) and 15(*a*), because it is repeatedly engaged with or disengaged from the roll body 6*c*, and undergoes friction with the elastic pad 5 as well.

Reference numeral 11 generally shows a roll-driving mechanism designed to engage the elastic rotating roll 6 with the metallic strip S and elastic pad 5, which is not herein explained because it is the same as a roll-driving mechanism used with the above-described conventional seal assembly.

INDUSTRIAL APPLICABILITY

As hitherto mentioned, the present invention provides a seal assembly 3 located at an entrance and/or exit of a heat treatment furnace for heat treating a continuously fed metallic strip (S) using an atmospheric gas containing hydrogen gas in operating the heat treatment furnace and including an elastic rotating roll 6 which is engaged with an elastic pad 5 fixed on the surface of a seal plate 4 and the metallic strip (S) to seal the inside of the furnace against the outside air, wherein:

at least two closely-set slip disks 7 arranged in an axial direction of the side of a roll body 6*c* and, at least one of elastic discs 8, which is engaged with the side plate 2*a* of the furnace wall 2, are fitted over a roll shaft 6*a* between the side plate 2*a* of the furnace wall 2 on which the elastic rotating roll 6 is rotatably mounted and the roll body 6*c* of the elastic rotating roll 6, the slip disk and said elastic disk being in surface contact with each other, and of the contact surfaces of the parts present from the roll body 6*c* to the side plate 2*a* of the furnace wall 2, the contact surface of the slip disks 7 and 7 has the lowest coefficient of dynamic friction, so that the roll body 6*c* of the elastic rotating roll 6 engaged with the metallic strip S can be rotated in alignment with the movement of the metallic strip S. Between the roll body 6*c* of the elastic rotating roll 6 and the side plate 2*a* of the furnace wall 2, at least two closely arranged slip disks 7, 7 positioned on the side of the roll body 6*c* slip with each other on the plane C in FIG. 10. Thus, no slippage occurs on the contact surface between the roll body 6*c* and the slip disk 7 or elastic disk 8 attached adjacent thereto, (the plane D in FIG. 10(*a*); other embodiments of the planes D and E in FIGS. 11(*a*), 13(*a*) and 15(*a*); the plane E in FIG. 12(*a*); and the plane D in FIG. 14(*a*)) and on the contact surface between the side plate 2*a* of the furnace wall 2 and the disk (the elastic disk 8 of the embodiment in FIG. 1) located adjacent thereto (the planes A and B in FIG. 10(*a*) and the planes A and B in FIG. 11(*a*) to 15(*a*) showing other embodiments).

In other words, at least two closely arranged slip disks 7 and elastic disks 8 are located in the described order on the side of the roll body 6*c* while they are brought in contact with each other, and of the contact surfaces of these disks, the contact surface of the slip disks 7 and 7 has the lowest coefficient of dynamic friction. Thus, when the roll body 6*c* is rotated in alignment with the movement of the metallic strip S, the rotation of the roll body 6*c* is transmitted to the slip disks 7. Then, the slip disks 7 and 7 slip with each other on the contact surface, so that the transmission of the rotation of the roll body 6*c* to the elastic disk 8 located on the side of the side plate 2*a* of the furnace wall 2 can be avoided. Consequently, no slippage occurs on the contact surfaces exclusive of that between the slip disks 7 and 7; so the wearing-away of the ends of the roll body 6*c* of the elastic rotating roll 6, the elastic disk 8 and the side plate 2*a* of the furnace wall 2 can be avoided. The slip disks 7, because of consisting only of fluorocarbon resin or composed mainly of fluorocarbon resin which the slip disk is made of, the slip disk has a low coefficient of friction and so is very low in resistance to rotation. Moreover, since they are less wearable by slippage, they produces no or little swarf, so that the surface of the metallic strip S, which is required to be kept clean, cannot be stained. To add to this, they undergoes no change in the coefficient of friction due to wearing; so they can work under constantly invariable conditions. This ensures that no disturbance is caused to fine tension control of the heated metallic strip S fed through the furnace, and that the power needed for the rotation of the elastic rotating roll 6 can be saved; that is, energy savings are achievable. In the present invention, it is preferable that slip disks 7*a* and 7*b* located on the fixed side, all but the slip disk 7 that rotates following the elastic rotating roll 6 or is located proximately to the side of the roll body 6*c*, are entirely formed of an unfilled or filled fluorocarbon resin, including the inner surfaces of holes through which the roll shaft 6*a* is passed, as shown in FIGS. 16(*a*) and (*b*). Such slip disks 7*a* and 7*b*, albeit coming into sliding friction with the roll shaft 6*a*, are decreased in terms of the wearing of the inner surfaces of the holes and resistance to rotation as well, because its coefficient of friction is low. Thus, the sealing properties of such sliding friction parts are much more improved.

Referring to the ability of the seal assembly to seal up the atmospheric gas containing hydrogen gas, the elastic disk 8 can be located in place while sufficient compression force is applied thereto to seal the disks against the atmospheric gas. Even in this case, it is unlikely that the rotation of the roll body 6*c* of the elastic rotating roll 6 may be transmitted to the side plate 2*a* of the furnace wall 2. Since slippage mainly occurs on the contact surface between the slip disks 7 and 7 that are less wearable and have a low coefficient of dynamic friction, it is possible to inhibit a decrease in the sealing properties of the ends of the elastic roll body 6*c*. Thus, the seal assembly can be used in good sealing condition over an extended period of time with no need of making repairs not only on the elastic disk 8 and slip disks 7 located between the roll body 6*c* of the elastic rotation roll 6 and the side plate 2*a* of the furnace wall 2 but also on the elastic rotating roll 6 and the side plate 2*a* of the furnace wall 2.

In the present invention, the slip disk 7 undergoing continuous friction is predominantly made of a fluorocarbon resin containing a filler selected from the group consisting of glass fiber, graphite, glass fiber plus molybdenum disulfide, glass fiber plus graphite, bronze, and carbon fiber, or is formed of a metallic plate 7*x* coated thereon with such a fluorocarbon resin, and the elastic disk 8 is made of silicone rubber, fluororubber, chloroprene rubber, nitrile-butadiene rubber, styrene-butadiene rubber, ethylene-propylene rubber, urethane rubber, hydrin rubber, butyl rubber, isoprene rubber, butadiene rubber, chlorinated polyethylene, acrylic rubber, polysulfide rubber, chlorosulfonated polyethylene. As the disks 7 and 8 those having an electric resistivity value of 1 to $10^7$ Ω·cm are used. Since static electricity primarily caused by the friction of the parts is removed therefrom through the furnace body 1 that is grounded, the risk of explosion or fire due to the ignition by electrostatic sparks of the furnace gas 12 leaking out of the seal assemblies 3 located at the entrance and exit can be reduced to the minimum. To add to this, when the parts such as the elastic pad 5 fixed on the surface of the seal plate 4, and the roll body 6*c* of the elastic rotating roll 6 are cleaned or inspected, the risk of explosion or fire due to the ignition of the furnace gas leaking out of the seal assembly 3 which is caused by spark discharge of static electricity caused by friction of the clothes and charged in the body of the worker through the finger tips can be decreased to the minimum. Thus, the safety of the seal assembly can be much more improved.

Figure 13A:
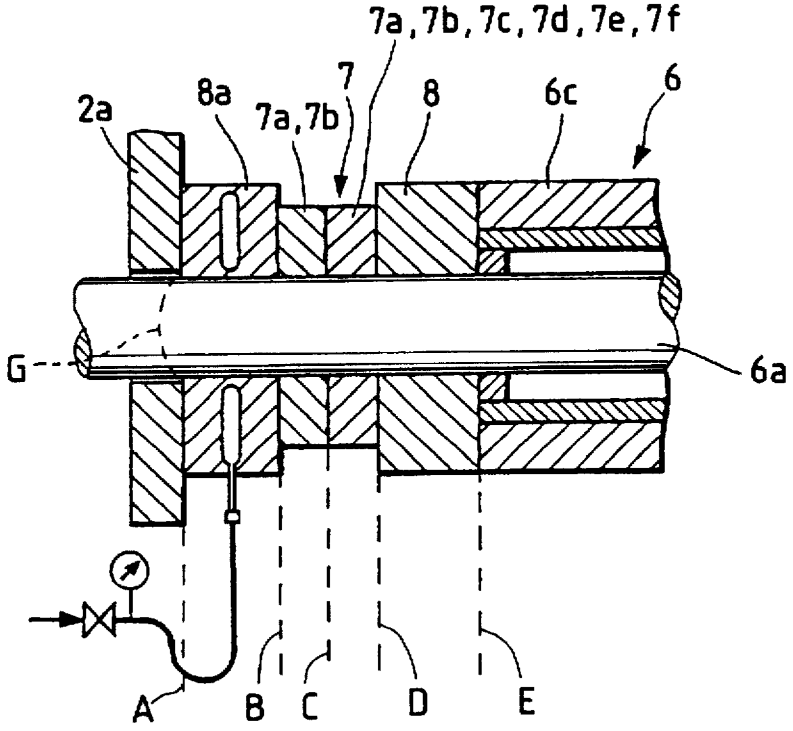
Figure 13B:
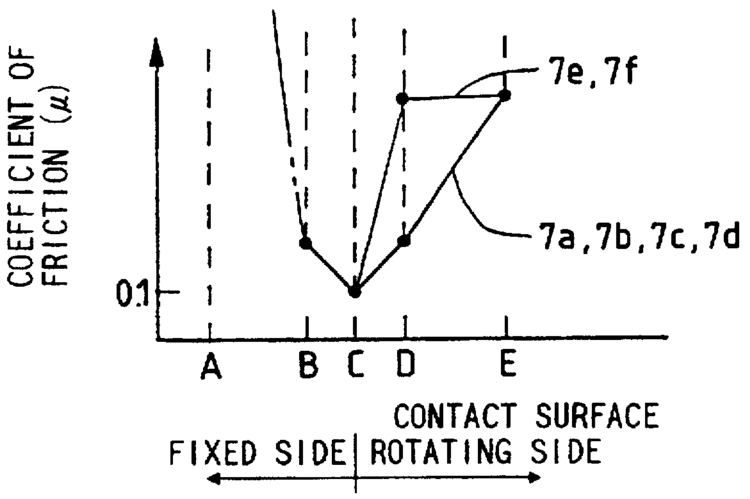

Preferably, a disk having the ability to be axially expanded with the fluid injected as shown at 8*a* in FIG. 13(*a*) is used as the elastic disk 8 to be engaged with the side plate 2*a* of the furnace wall 2. Even when it is worn away by a slippage on the contact surface, its width can be increased by a few milimeter by ten by regulating the pressure of the fluid injected, as desired, whereby a drop of the sealing properties of the ends of the elastic rotating roll 6 can be prevented.

The present seal assemblies for the entrance and exit of heat treatment furnaces using an atmospheric gas containing hydrogen gas have a number of benefits and so is of great industrial value.

What is claimed is:

1. A seal assembly located at at least one of an entrance and an exit of a heat treatment furnace with a side plate for heat treating a continuously fed metallic strip including an elastic rotating roll which has a roll body and a roll shaft, and is engaged with an elastic pad fixed on a surface of a seal plate and the metallic strip to seal an inside of the furnace against outside air, said seal assembly comprising:

at least two closely-set slip disks arranged in an axial direction of an end side of the roll body, and, at least one elastic disk engaging the side plate of the furnace, said at least two slip disks and at least one elastic disk being fitted over the roll shaft between the side plate of the furnace on which the elastic rotating roll is rotatably mounted and the roll body of the elastic rotating roll such that said at least two slip disks and said at least one elastic disk are in surface contact with each other, and in contact surfaces present from the roll body to the side plate of the furnace, the contact surfaces between the at least two slip disks having a lowest coefficient of dynamic friction.

2. The seal assembly for a heat treatment furnace as claimed in claim 1, wherein said at least two slip disks are made of a sheet form of fluorocarbon resin; a sheet form containing as a main component fluorocarbon resin added by a filler containing any one of glass fiber, graphite, glass fiber plus molybdenum disulfide, glass fiber plus graphite, bronze, and carbon fiber; or a sheet form of metal in which said fluorocarbon resin or said fluorocarbon resin with the filler is coated, sprayed, baked, or the materials in a form of a sheet being pasted to one side or both sides thereof, or an entire surface thereof including inner and outer and side surfaces.

3. The seal assembly for a heat treatment furnace as claimed in claim 2, wherein the surfaces of the at least two slip disks have an electric resistivity value of 1 to $10^7$ Ω·cm.

4. The seal assembly for a heat treatment furnace as claimed in claim 1, wherein said at least two closely-set slip disks arranged at the side end of the roll body and one slip disk that is located proximately to the roll body are slip disks made of a metallic plate having a metallic surface, or a slip disk in which materials containing only fluorocarbon resin or containing fluorocarbon resin as a main component added by a filler containing any one of glass fiber, graphite, glass fiber plus molybdenum disulfide, glass fiber plus graphite, bronze, and carbon fiber are coated, sprayed, baked, or the materials in a form of a sheet being pasted on one side or both sides of a metallic sheet, or an entire surface thereof including inner, outer and side surfaces thereof.

5. The seal assembly for a heat treatment furnace as claimed in claim 1, wherein the at least one elastic disk is made of a rubber material selected from a group consisting of silicone rubber, fluororubber, chloroprene rubber, nitrile-butadiene rubber, styrene-butadiene rubber, ethylene-propylene rubber, urethane rubber, hydrin rubber, butyl rubber, isoprene rubber, butadiene rubber, chlorinated polyethylene, acrylic rubber, polysulfide rubber, and chlorosulfonated polyethylene.

6. The seal assembly for a heat treatment furnace as claimed in claim 1, wherein the elastic disk engaged with the side plate of the furnace includes an expanding mechanism that is axially actuated by a pressure of a fluid to be injected.

7. The seal assembly for a heat treatment furnace as claimed in claim 1, wherein the at least one elastic disk has an electric resistivity value of 1 to $10^7$ Ω·cm.

8. The seal assembly for a heat treatment furnace as claimed in claim 1, wherein one of said at least two slip disks located at a side of the elastic rotating roll substantially rotates together with rotation of the elastic rotating roll, and the other of said at least two slip disks located at a side of the side plate of the furnace does not substantially rotate so that said at least two slip disks slip relative to each other.

* * * * *